US009809372B2

(12) United States Patent
Sebastian et al.

(10) Patent No.: US 9,809,372 B2
(45) Date of Patent: Nov. 7, 2017

(54) HUMIDITY CONTROL INSERT FOR CIGARETTE PACKS

(71) Applicant: R.J. REYNOLDS TOBACCO PRODUCTS, Winston-Salem, NC (US)

(72) Inventors: Andries Don Sebastian, Clemmons, NC (US); Lisa Brown, Lexington, NC (US); Frank Kelley St. Charles, Lewisville, NC (US); Ercilia B. Hernandez Garcia, Cary, NC (US); Pankaj C. Patel, Clemmons, NC (US); Craig T. Demarest, Oak Ridge, NC (US); Daniel V. Cantrell, Lewisville, NC (US)

(73) Assignee: R.J. Reynolds Tobacco Products, Winston-Salem, NC (US)

( * ) Notice: Subject to any disclaimer, the term of this patent is extended or adjusted under 35 U.S.C. 154(b) by 0 days.

(21) Appl. No.: 15/422,039

(22) Filed: Feb. 1, 2017

(65) Prior Publication Data

US 2017/0158407 A1 Jun. 8, 2017

Related U.S. Application Data

(62) Division of application No. 14/600,914, filed on Jan. 20, 2015, now Pat. No. 9,566,605.

(51) Int. Cl.

| | |
|---|---|
| ***B01D 53/02*** | (2006.01) |
| ***B65D 81/26*** | (2006.01) |
| ***B05D 3/12*** | (2006.01) |
| ***B05D 3/02*** | (2006.01) |
| ***B65D 85/10*** | (2006.01) |

(52) U.S. Cl.

CPC ......... *B65D 81/264* (2013.01); *B05D 3/0254* (2013.01); *B05D 3/12* (2013.01); *B65D 85/1081* (2013.01)

(58) Field of Classification Search

CPC .... B01D 53/261; B01D 53/28; B01J 20/2805; B01J 20/22; B01J 20/26; B01J 20/261

See application file for complete search history.

(56) References Cited

U.S. PATENT DOCUMENTS

| | | | |
|---|---|---|---|
| 3,695,422 | A | 10/1972 | Tripodi |
| 3,874,581 | A | 4/1975 | Fox et al. |
| 3,944,066 | A | 3/1976 | Niepmann |
| 4,717,017 | A | 1/1988 | Sprinkel et al. |
| 4,807,745 | A | 2/1989 | Langley et al. |
| 4,852,734 | A | 8/1989 | Allen et al. |

(Continued)

FOREIGN PATENT DOCUMENTS

EP 0 392 737 10/1990

OTHER PUBLICATIONS

The International Search Report and Written Opinion of the International Searching Authority issued in PCT/US2016/013047, dated Mar. 16, 2016.

*Primary Examiner* — Christopher P Jones
(74) *Attorney, Agent, or Firm* — Foley & Lardner LLP

(57) ABSTRACT

Provided herein is a humidity control insert for packages such as cigarette packs. The humidity control insert comprises a porous nonwoven fibrous substrate and a hygroscopic powder material dispersed within the porous nonwoven fibrous substrate. Further provided is a package, such as a cigarette pack, comprising the humidity control insert, wherein the humidity control insert is adapted to release moisture retained therein into an internal air space of the cigarette pack.

15 Claims, 2 Drawing Sheets

(56) References Cited

U.S. PATENT DOCUMENTS

| | | | |
|---|---|---|---|
| 4,934,524 | A | 6/1990 | St. Charles |
| 4,997,082 | A | 3/1991 | Durocher |
| 5,037,459 | A | 8/1991 | Spruill et al. |
| 5,139,140 | A | 8/1992 | Burrows et al. |
| 5,248,031 | A | 9/1993 | Burrows et al. |
| 5,333,729 | A | 8/1994 | Wolfe |
| 5,379,889 | A | 1/1995 | Cobler |
| 6,364,106 | B1 | 4/2002 | Fagg et al. |
| 6,693,148 | B2 | 2/2004 | Tomlinson et al. |
| 6,733,845 | B1 | 5/2004 | Caramaro et al. |
| 7,014,039 | B2 | 3/2006 | Henson et al. |
| 7,048,115 | B2 | 5/2006 | Stringfield |
| 7,228,961 | B2 | 6/2007 | Koetter et al. |
| 7,823,731 | B2 | 11/2010 | Wu |
| 8,118,161 | B2 | 2/2012 | Guerrera et al. |
| 8,522,515 | B2 | 9/2013 | Carter et al. |
| 2008/0230410 | A1 | 9/2008 | Jones et al. |

HUMIDITY CONTROL INSERT FOR CIGARETTE PACKS

CROSS REFERENCE TO RELATED APPLICATIONS

The present application is a Divisional of U.S. patent application Ser. No. 14/600,914, filed Jan. 20, 2015, and the contents of which are incorporated herein by reference in its entirety.

FIELD OF THE DISCLOSURE

The present disclosure relates to a humidity control insert for cigarette packs. In particular, the present disclosure relates to a humidity control insert comprising a porous nonwoven fibrous substrate and a hygroscopic powder material dispersed within the porous nonwoven fibrous substrate.

DISCLOSURE OF RELATED ART

Cigarettes conventionally have been sold in packages, with each package often containing twenty (20) cigarettes. Typical cigarette packages have a generally rectangular parallelepiped form. One type of popular cigarette package employs a container having the form of a so-called "hard pack," "crush proof box" or "hinged lid package." See, for example, U.S. Pat. No. 3,874,581 to Fox et al.; U.S. Pat. No. 3,944,066 to Niepmann; U.S. Pat. No. 4,852,734 to Allen et al.; European Pat. 0392737 to Moeller; and U.S. Pub. Pat. App. No. 2008/0230410 to Jones et al., each of which is incorporated herein by reference. Another type of popular cigarette package employs a container having the form of the so-called "soft pack." See, for example, U.S. Pat. No. 3,695,422 to Tripodi; U.S. Pat. No. 4,717,017 to Sprinkel et al.; and U.S. Pat. No. 5,333,729 to Wolfe, each of which is incorporated herein by reference. Both types of cigarette packages are normally packed in cartons also of generally rectangular parallelepiped form, typically ten (10) packages to a carton.

Additional examples of cigarette packages can be found in U.S. Pat. No. 8,522,515 to Carter et al.; U.S. Pat. No. 8,118,161 to Guerrera et al.; U.S. Pat. No. 7,823,731 to Wu; U.S. Pat. No. 7,228,961 to Koetter et al.; U.S. Pat. No. 7,048,115 to Stringfield; U.S. Pat. No. 7,014,039 to Henson et al.; U.S. Pat. No. 6,364,106 to Fagg et al.; U.S. Pat. No. 5,379,889 to Cobler et al.; U.S. Pat. No. 5,248,031 to Burrows et al.; U.S. Pat. No. 5,139,140 to Burrows et al.; and U.S. Pat. No. 4,807,745 to Langley et al., each of which is incorporated herein by reference.

Paper inserts are currently used in most commercial cigarette packs for the purpose of product promotion and to carry certain printed information, but do not otherwise offer any functional benefit to the cigarette pack. Some commercial cigarette packs, however, might lose moisture in their internal air space while the packs are being aged on the shelves. This is particularly true for cigarette packs that are manufactured without additives.

Accordingly, it would be desirable to provide cigarette packs with improved moisture retention. In addition, it would be desirable to provide additional functional benefits to paper inserts that are currently used in commercial cigarette packs.

SUMMARY

The above and other needs are met by aspects of the present disclosure which, in a first aspect, provides a humidity control insert for cigarette packs, comprising a porous nonwoven fibrous substrate and a hygroscopic powder material dispersed within the porous nonwoven fibrous substrate.

In second aspect, a cigarette pack is provided, wherein the cigarette pack comprises the humidity control insert described herein. The humidity control insert is adapted to release moisture retained therein into the internal air space of the cigarette pack.

In a third aspect, a method for making the humidity control insert described herein is provided. The method comprises dispersing a hygroscopic powder material into a porous nonwoven fibrous substrate by a dry powder impregnation process.

In a fourth aspect, a method for making the cigarette pack described herein is provided. The method comprises providing a humidity control insert by dispersing a hygroscopic powder material into a porous nonwoven fibrous substrate by a dry powder impregnation process, bringing the insert to a desired moisture level, and inserting the humidity control insert into the cigarette pack.

Further features and advantages of the present disclosure are set forth in more detail in the following description.

BRIEF DESCRIPTION OF THE DRAWINGS

Figure 1:
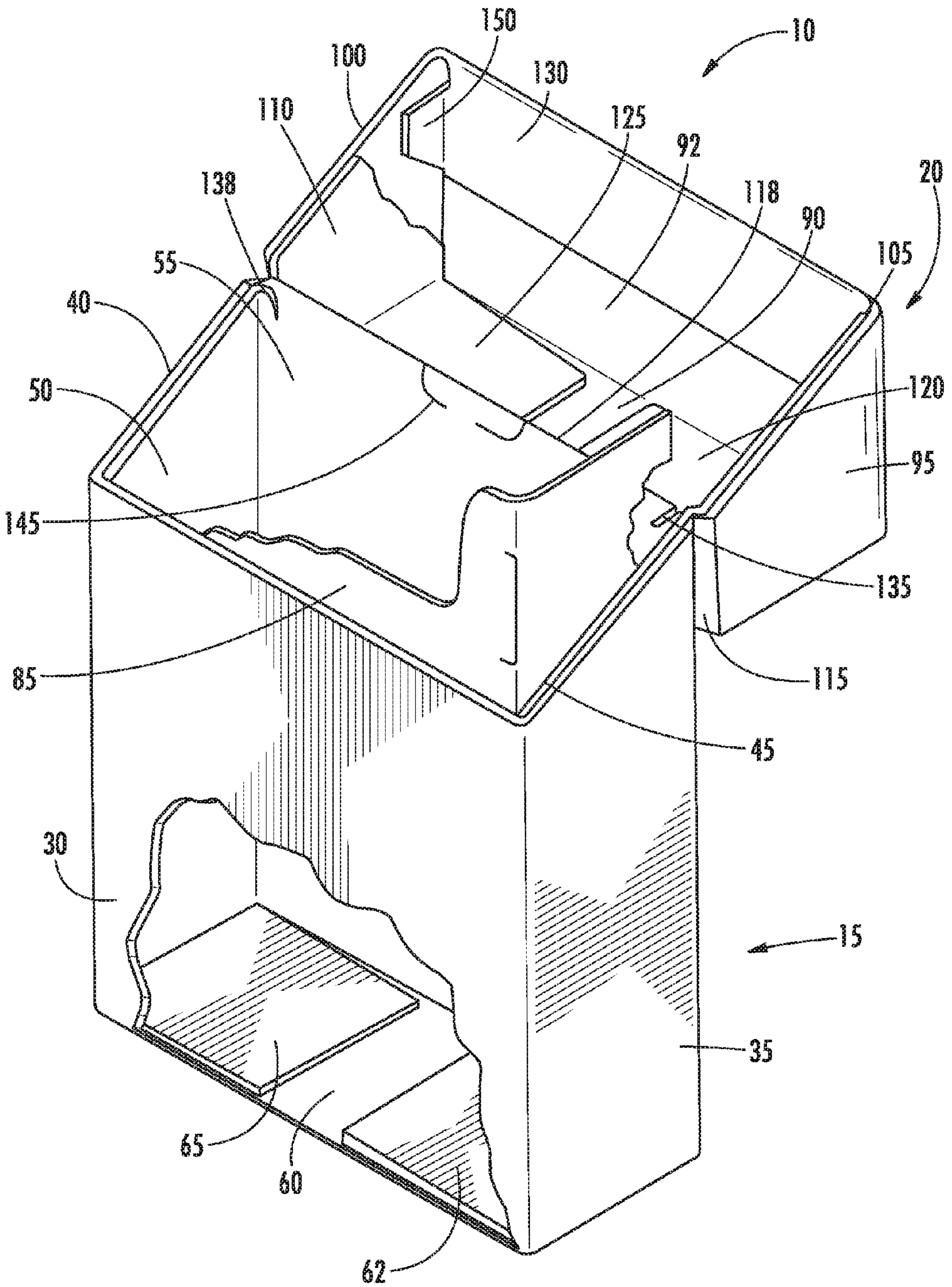
Figure 2:
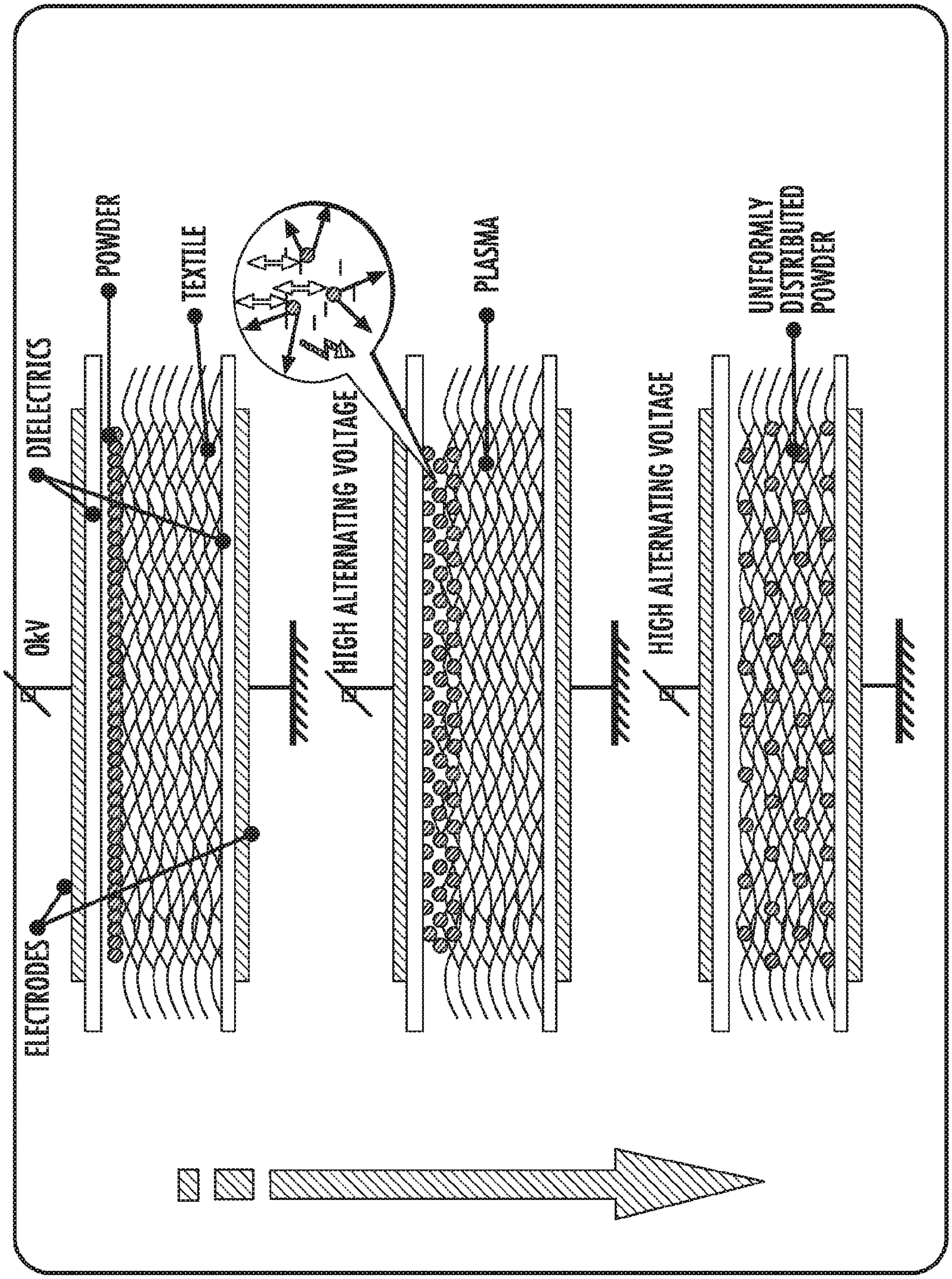

Having thus described the disclosure in general terms, reference will now be made to the accompanying drawings, which are not necessarily drawn to scale, and wherein:

FIG. 1 is a perspective view of an exemplary cigarette pack with which various embodiments of a humidity control insert may be incorporated and/or inserted; and FIG. 2 shows an example of the dry powder impregnation process for making the humidity control insert described herein.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

Humidity Control Insert

In various embodiments, the invention described herein relates to a humidity control insert for cigarette packs, comprising a porous nonwoven fibrous substrate and a hygroscopic powder material dispersed within the porous nonwoven fibrous substrate.

In some embodiments, the hygroscopic powder material is dispersed into the porous nonwoven fibrous substrate by a dry powder impregnation process. In some embodiments, the hygroscopic powder material is dispersed into the porous nonwoven fibrous substrate by a dry powder impregnation process using an alternating electric field, which can be generated by two face-to-face plate electrodes connected to an alternating high tension generator. In some embodiments, the porous nonwoven fibrous substrate is then heated and compacted to immobilize the hygroscopic powder material dispersed therein.

In some embodiments, the porous nonwoven fibrous substrate has a thickness, wherein the hygroscopic powder material is dispersed throughout the thickness of the porous nonwoven fibrous substrate. In some embodiments, the hygroscopic powder material is dispersed throughout the entire bulk of the porous nonwoven fibrous substrate.

The porous nonwoven fibrous substrate can comprise, for example, at least one polymeric material. In some embodiments, the porous nonwoven fibrous substrate comprises at least one polymer selected from the group consisting of polyethylene, polystyrene, polyvinylchloride, cellophane, polycarbonate, polyester, polyamides, polyurethane, ethylcellulose, cellulose acetate, polybutylene, polypropylene, polyethylene terephthalate, polyvinylidene chloride, polyvinylidene fluoride, polyvinyl fluoride, polyvinyl alcohol, and copolymers thereof. In some embodiments, the porous nonwoven fibrous substrate comprises at least one polymer selected from the group consisting of high density polyethylene, oriented polystyrene, microporous polyethylene, microfiberous polyethylene and polyvinylchloride. In some embodiments, the porous nonwoven fibrous substrate comprises biodegradable and thermoplastic fibers. Examples of such fibers are polyglycolic acid (PGA), polylactic acid (PLA) (e.g., poly(L-lactic acid) or poly(DL-lactic acid)), polyhydroxyalkanoates (PHAs) such as polyhydroxypropionate, polyhydroxyvalerate, polyhydroxybutyrate, polyhydroxyhexanoate, and polyhydroxyoctanoate, polycaprolactone (PCL), polybutylene succinate, polybutylene succinate adipate, and copolymers thereof (e.g., polyhydroxybutyrate-co-hydroxyvalerate (PHBV)). Specific examples of commercially available PLA fibers include Ecodear® from Toray of Japan; Ingeo™ based PLA fibers from Fiber Innovations Technology, USA; and PLA fibers from Trevira GmbH. PLA and PHA materials can be sourced from a variety of plant materials, including tobacco. In certain embodiments, the thermoplastic polymer can comprise plasticized cellulose acetate and/or calcium alginate.

The hygroscopic powder material can be, for example, adapted to create a desired relative humidity in an air space adjacent to the humidity control insert. The hygroscopic powder material can comprise, for example, at least one salt, sugar, sugar alcohol, and/or polybasic acid. In some embodiments, the hygroscopic powder material comprises at least one salt selected from the group consisting of sodium salts, potassium salts, magnesium salts, calcium salts, ammonium salts, and lithium salts. In some embodiments, the hygroscopic powder material comprises at least one salt selected from the group consisting of sodium nitrite, sodium nitrate, sodium chloride, sodium bromide, sodium iodide, potassium nitrite, potassium nitrate, potassium chloride, potassium bromide, potassium iodide, potassium sulfate, potassium carbonate, potassium hydroxide, ammonium nitrate, ammonium chloride, ammonium sulfate, ammonium carbonate, and calcium chloride. In one embodiment, the hygroscopic powder material comprises potassium citrate monohydrate. A saturated potassium citrate solution has a water activity of 0.625 (i.e., providing a 62.5% RH inside the cigarette pack).

In some embodiments, the hygroscopic powder material comprises at least one sugar selected from the group consisting of sucrose, fructose, glucose, and galactose. In some embodiments, the hygroscopic powder material comprises at least one sugar alcohol selected from the group consisting of sorbitol, xylitol, and mannitol. In some embodiments, the hygroscopic powder material comprises at least one polybasic acid or salt thereof selected from the group consisting of citric acid or salts thereof, malic acid or salts thereof, and succinic acid or salts thereof.

In some embodiments, the hygroscopic powder material is substantially free of halogen anions. In some embodiments, the hygroscopic powder material is a food grade material. In some embodiments, the size of the hygroscopic powder material is adapted to fit the pore size of the porous nonwoven fibrous substrate.

In some embodiments, the hygroscopic powder material accounts for 1-50 wt. % of the dry weight of the humidity control insert. In some embodiments, the hygroscopic powder material accounts for 5-40 wt. % of the dry weight of the humidity control insert. In more particular embodiments, the hygroscopic powder material accounts for 10-30 wt. % of the dry weight of the humidity control insert.

In some embodiments, the porous nonwoven fibrous substrate accounts for 50-99 wt. % of the dry weight of the humidity control insert. In more particular embodiments, the porous nonwoven fibrous substrate accounts for 60-95 wt. % of the dry weight of the humidity control insert. In still more particular embodiments, the porous nonwoven fibrous substrate accounts for 70-90 wt. % of the dry weight of the humidity control insert.

The powder loaded nonwoven substrate may be laminated on both sides with a water vapor permeable film that is resistant to liquid moisture permeation. In addition, the lamination of the insert on all sides prevents cross contamination of the cigarettes with the humidity control chemicals. The film lamination step may be combined with insert cutting (e.g., using an ultrasonic process).

The film lamination on both sides of the powder loaded nonwoven substrate can be accomplished in a number of manners. For example, a pouch can be made by sealing only the edges of the substrate. Alternatively, one can completely laminate the powder loaded substrate with polymer so that the final product is a plastic film that encapsulates the powder loaded nonwoven, thereby immobilizing the nonwoven substrate with powder. In both of the above processes, the final product can be loaded with moisture to a desired level, such as 65% RH in one embodiment, before being inserted to the cigarette pack.

In some embodiments, at least one side of the humidity control insert is laminated with a paper or film optionally comprising printed information. In some embodiments, both sides of the humidity control insert are laminated with a paper or film optionally comprising printed information.

Cigarette Pack

In various embodiments, the invention described herein relates to a cigarette pack comprising a humidity control insert disposed therein, wherein the humidity control insert comprises a porous nonwoven fibrous substrate and a hygroscopic powder material dispersed within the porous nonwoven fibrous substrate, and wherein the humidity control insert is adapted to release moisture retained therein into the internal air space of the cigarette pack. The humidity control insert can be included in various different prior art cigarette packages, such as those described in U.S. Pat. No. 4,852,734 to Allen et al.; U.S. Pat. No. 8,522,515 to Carter et al.; U.S. Pat. No. 8,118,161 to Guerrera et al.; U.S. Pat. No. 7,823,731 to Wu; U.S. Pat. No. 7,228,961 to Koetter et al.; U.S. Pat. No. 7,048,115 to Stringfield; U.S. Pat. No. 7,014,039 to Henson et al.; U.S. Pat. No. 6,364,106 to Fagg et al.; U.S. Pat. No. 5,379,889 to Cobler et al.; U.S. Pat. No. 5,248,031 to Burrows et al.; U.S. Pat. No. 5,139,140 to Burrows et al.; and U.S. Pat. No. 4,807,745 to Langley et al.

FIG. 1 is a perspective view of an exemplary cigarette pack 10 with which various embodiments of a humidity control insert may be incorporated and/or inserted. The cigarette pack 10 of FIG. 1 includes a body portion 15 and a lid portion 20. The body portion 15 includes a front wall 30 (shown as partially cut away), outer side walls 35 and 40, inner side walls 45 and 50, rear wall 55, bottom wall 60, and bottom flaps 62 and 65. The upper edges of the inner and outer side walls of the body portion 15 of the cigarette pack 10 can extend from the front of the cigarette pack 10 to the back thereof at an upward incline of about 30°, or any other desired angle. Generally, the inner and outer side walls of each side of the body portion 15 are of similar shape and dimension. An inner frame or collar 85 (shown as partially cut away) is glued or otherwise secured to the inner surface of a portion of the front wall 30 and the inner side wall 45 and 50. It is understood that packages having integral inner frame can be employed, if desired.

The lid portion 20 includes a top wall 90, front wall 92, outer side walls 95 and 100, inner side wall 105 and inner side wall 110 (shown as partially cut away), and rear wall 115 which is integrally hinged to rear wall 55 of the body 15. The lower edges of the inner and outer side walls of the lid portion 20 of the cigarette pack 10 can extend from the front of the cigarette pack 10 to the back thereof at an upward incline of about 30°, or any other desired angle. Generally, the inner and outer side walls of each side of the lid are of similar shape and dimension.

The hinge 118 has the form of a crease, fold or score line across the rear wall of the cigarette pack 10. The lid portion also includes top flaps 120 and 125, and reinforcing panel 130. The box 10 also can include tear minimizers 135 and 138, and stress reliever 145 in the region of hinge 118, as is common in conventional hinge lid package manufacture.

A tab 150 is integrally connected to one side of the lid reinforcing panel 130 and extends between lid outer side wall 100 and lid inner side wall 110 (shown as cut away). In particular, a fold between the reinforcing panel and the tab 150 allows the tab to fit between the two side wall portions. A similar tab (not shown) is connected to the opposite side of the lid reinforcing panel, and is fit between lid outer side wall 95 and lid inner side wall 105. Additional details concerning the cigarette pack 10 are provided in U.S. Pat. No. 4,852,734.

In some embodiments, the humidity control insert provides a relative humidity of 1-99%, or 5-95%, or 10-90%, or 20-80%, or 30-70% in the internal air space of the cigarette pack. In more particular embodiments, the humidity control insert provides a relative humidity of 55% to 65% or 57.5% to 62.5% in the internal air space of the cigarette pack. In some embodiments, the inclusion of the humidity control insert extends the time to reach an unacceptable level of relative humidity in the internal air space of the cigarette pack by at least 50%, or at least 100%, or at least 200%, or at least 500%.

In some embodiments, the cigarettes are manufactured substantially without additives. In some embodiments, the cigarettes are manufactured substantially without humectants.

In alternative embodiments, the cigarette package itself can comprise an inner frame which comprises a porous nonwoven fibrous substrate and a hygroscopic powder material dispersed within the porous nonwoven fibrous substrate, and wherein the inner frame of the cigarette package is adapted to release moisture retained therein into the internal air space of the cigarette pack. Still further, the porous nonwoven fibrous substrate material can be laminated or otherwise bonded to the inner bundle foil inside the cigarette pack. These processes allow one to avoid the separate manufacture of an insert that needs to be separately inserted into the cigarette pack.

In some embodiments, the inner frame of the cigarette package provides a relative humidity of 1-99%, or 5-95%, or 10-90%, or 20-80%, or 30-70% in the internal air space of the cigarette pack.

In addition to cigarette packs, the humidity control insert described herein can also be included in a package for a moisture laden article, wherein the package comprise a pack body and the humidity control insert, and wherein the humidity control insert is adapted to release moisture retained therein into an internal air space defined by the pack body.

In some embodiments, the moisture laden article is selected from the group consisting of snuff, snus, cigars, dissolvable tobacco products, and nicotine replacement therapy (NRT) products. In some embodiments, the moisture laden article is selected from the group consisting of food products and herbs, including intermediate or low moisture foods and herbs.

Method for Making Humidity Control Insert and Cigarette Pack

The present invention described herein also relates to a method for making a humidity control insert, comprising dispersing a hygroscopic powder material into a porous nonwoven fibrous substrate by a dry powder impregnation process. An example of the dry powder impregnation process is shown in FIG. 2.

In some embodiments and as shown in FIG. 2, the hygroscopic powder material is dispersed into the porous nonwoven fibrous substrate by a dry powder impregnation process using an alternating electric field, which can be generated by two face-to-face plate electrodes connected to an alternating high tension generator. The electrodes can be, for example, protected by a suitable dielectric material. The space between the electrodes can be, for example, adjustable according to the thickness of the porous nonwoven fibrous substrate.

In some embodiments of the dry powder impregnation process, a suitable quantity of the hygroscopic powder material is scattered onto the porous nonwoven fibrous substrate; the fibrous support is then placed between the two dielectrics; and a strong alternating electric field is created by a high tension applied to the electrodes. At the end of the treatment, the hygroscopic powder material scattered on top of the porous nonwoven fibrous substrate find themselves dispersed inside the porous nonwoven fibrous substrate. In some embodiments of the dry powder impregnation process, a substantially homogeneous distribution of the hygroscopic powder material inside the porous nonwoven fibrous substrate is achieved. In some embodiments of the dry powder impregnation process, substantially no raise in temperature occurs between the electrodes, while at the end of the treatment substantially no static electricity remains inside the porous nonwoven fibrous substrate dispersed with the hygroscopic powder material.

In some embodiments, the hygroscopic powder material is dispersed into the porous nonwoven fibrous substrate by the Fibroline powder impregnation process.

In some embodiments, the method further comprises heating and compacting the porous nonwoven fibrous substrate to immobilize the hygroscopic powder material disperse therein.

The present invention described herein also relates to a method for making a cigarette pack, comprising dispersing a hygroscopic powder material into a porous nonwoven fibrous substrate by a dry powder impregnation process, and inserting a humidity control insert obtained thereby into a cigarette pack.

In some embodiments, the method further comprises retaining moisture into the porous nonwoven fibrous substrate dispersed with the hygroscopic powder material before inserting the humidity control insert into the cigarette pack. The humidity control insert may be stored in a controlled humidity chamber having a desired relative humidity to absorb moisture. In some embodiments, sufficient water is added to the insert to bring the water activity to a desired level or even slight greater than the desired level so the excess water will condition the cigarettes and packaging to the desired final water activity.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that equivalents, modifications, and other aspects are intended to be included within the scope of the appended claims. Although specific terms are employed herein, they are used in a generic and descriptive sense only and not for purposes of limitation.

That which is claimed:

1. A method for making a humidity control insert for a package, the humidity control insert comprising a porous nonwoven fibrous substrate and a hygroscopic powder material dispersed within the porous nonwoven fibrous substrate, the method comprising:

dispersing the hygroscopic powder material into the porous nonwoven fibrous substrate by a dry powder impregnation process;

wherein the hygroscopic powder material is dispersed into the porous nonwoven fibrous substrate using an alternating electric field.

2. The method of claim 1, further comprising heating and compacting the porous nonwoven fibrous substrate so as to immobilize the hygroscopic powder material.

3. The method of claim 1, further comprising retaining moisture into the porous nonwoven fibrous substrate dispersed with the hygroscopic powder material.

4. The method of claim 3, further comprising inserting the humidity control insert into the package.

5. The method of claim 4, further comprising heating and compacting the porous nonwoven fibrous substrate to immobilize the hygroscopic powder material.

6. The method of claim 4, further comprising retaining moisture into the porous nonwoven fibrous substrate dispersed with the hygroscopic powder material before inserting the humidity control insert into the package.

7. The method of claim 3, further comprising adding water to the humidity control insert.

8. The method of claim 3, further comprising storing the humidity control insert in a humidity chamber;

wherein humidity control insert is configured to absorb moisture from the humidity chamber.

9. The method of claim 1, further comprising laminating the porous nonwoven fibrous substrate so as to immobilize the hygroscopic powder material.

10. A method for making a humidity control insert for a package, the humidity control insert comprising a porous nonwoven fibrous substrate and a hygroscopic powder material dispersed within the porous nonwoven fibrous substrate, the method comprising:

dispersing the hygroscopic powder material into the porous nonwoven fibrous substrate by a dry powder impregnation process; and heating and compacting the porous nonwoven fibrous substrate so as to immobilize the hygroscopic powder material.

11. The method of claim 10, further comprising retaining moisture into the porous nonwoven fibrous substrate dispersed with the hygroscopic powder material.

12. The method of claim 11, further comprising adding water to the humidity control insert.

13. The method of claim 11, further comprising storing the humidity control insert in a humidity chamber;

wherein humidity control insert is configured to absorb moisture from the humidity chamber.

14. The method of claim 11, further comprising inserting the humidity control insert into the package.

15. The method of claim 14, further comprising retaining moisture into the porous nonwoven fibrous substrate dispersed with the hygroscopic powder material before inserting the humidity control insert into the package.

* * * * *